(12) United States Patent
Sorsa et al.

(10) Patent No.: US 6,304,077 B1
(45) Date of Patent: Oct. 16, 2001

(54) METHOD AND APPARATUS FOR DEFINING THE POSITION OF AN ACTUATOR UTILIZING PARTS OF PULSE INTERVALS

(75) Inventors: Jukka Sorsa; Juha Sanaksenaho, both of Tampere; Kimmo Saunisto, Jyskä, all of (FI)

(73) Assignee: Metso Paper Automation, Inc., Tampere (FI)

( * ) Notice: Subject to any disclaimer, the term of this patent is extended or adjusted under 35 U.S.C. 154(b) by 0 days.

(21) Appl. No.: 09/233,543

(22) Filed: Jan. 20, 1999

(30) Foreign Application Priority Data

Jan. 23, 1998 (FI) .................................................... 980152

(51) Int. Cl.⁷ .................................................... G01B 7/14
(52) U.S. Cl. ........................................ 324/207.2; 318/594
(58) Field of Search ........................... 324/207.2, 207.22, 324/207.24; 318/594, 599; 338/324; 377/17

(56) References Cited

U.S. PATENT DOCUMENTS

| 3,981,767 | * | 9/1976 | Al-Shaikh ............................ 162/198 |
| 4,081,995 | | 4/1978 | Griffith et al. ........................ 73/116 |
| 4,571,530 | * | 2/1986 | Sweeney, Jr. ........................ 318/594 |
| 4,814,704 | * | 3/1989 | Zerrien, Jr. et al. ............. 324/207.12 |
| 5,297,048 | | 3/1994 | Gauer ............................... 364/431.12 |
| 5,317,614 | * | 5/1994 | Davis et al. ........................... 377/17 |

FOREIGN PATENT DOCUMENTS

| 2225415 | 11/1988 | (GB) . |
| 60-262010 | 12/1985 | (JP) . |
| 9320346 | 10/1993 | (WO) . |

OTHER PUBLICATIONS

Patent Abstract of Japan of JP 60262010 of Dec. 1985.

* cited by examiner

*Primary Examiner*—Christine Oda
*Assistant Examiner*—Subhash Zaveri
(74) *Attorney, Agent, or Firm*—Ladas & Parry

(57) ABSTRACT

The invention relates to a method and an apparatus for defining the position of an actuator. The position of the actuator (1) is measured by a measuring signal (3) proportional to the rotation of a shaft (6) of the actuator (1). The measuring signal (3) comprises successive pulses. The intervals between the pulses are divided into parts, and the position of the actuator (1) between the pulses is defined utilizing the parts of the divided pulse intervals.

15 Claims, 1 Drawing Sheet

Figure 1:
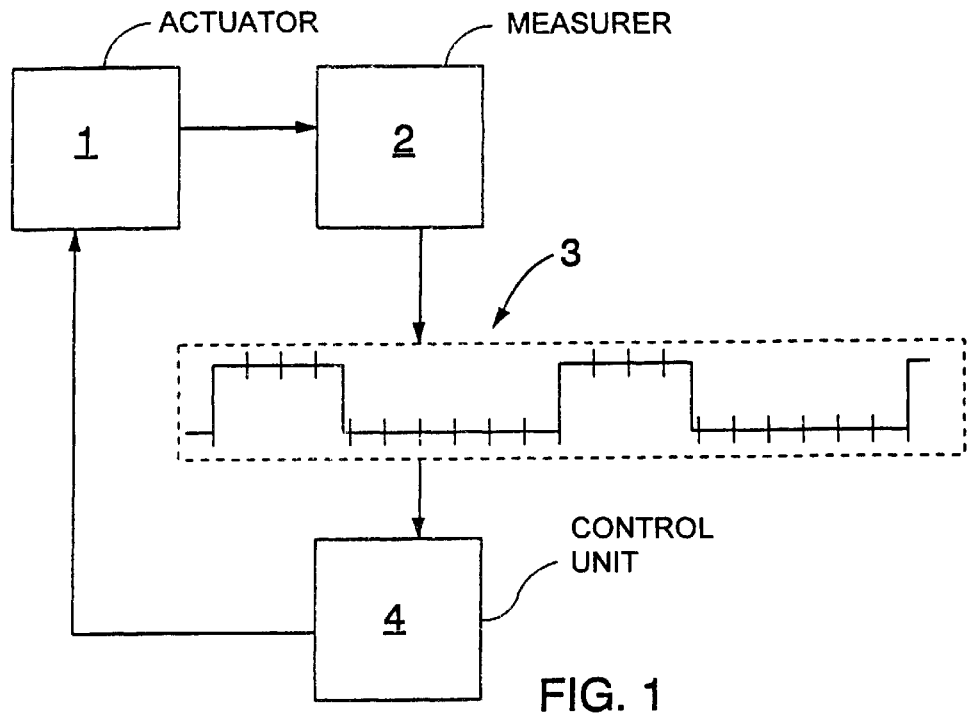

METHOD AND APPARATUS FOR DEFINING THE POSITION OF AN ACTUATOR UTILIZING PARTS OF PULSE INTERVALS

The invention relates to a method for defining the position of an actuator of a paper or board machine, the position of the actuator being measured in the method by means of a measuring signal proportional to the rotation of a shaft of the actuator, the measuring signal comprising successive pulses.

The invention further relates to an apparatus for defining the position of an actuator of a paper or board machine, the apparatus comprising measuring means for measuring the position of the actuator, the measuring means being arranged to generate a measuring signal comprising successive pulses and being proportional to the rotation of a shaft of the actuator.

Actuators are used, for example, to control the flow of different media, such as water and steam, in different processes. The actuators control a valve, nozzle or the like supplying the medium. The actuator can be a motor, cylinder or the like, which can be controlled in many different ways, for example mechanically, electrically, hydraulically or pneumatically.

It is previously known to use measuring devices in conjunction with the actuators of a paper machine to define the position of the actuator of the paper machine, the measuring devices generating binary pulses, whereby the position of the actuator is proportional to the number of pulses. As the shaft of the actuator rotates, the measuring device detects the rotating movement and sends a measuring pulse as a certain point of the shaft of the actuator revolves past the sensor of the measuring device. Such a solution is disclosed in GB 2 225 415, which discloses a fluid flow valve controlled by a stepping motor. The position of the valve can be measured by an optical shaft encoder. A problem in the use of the measuring device generating binary pulses is that the actuator cannot always be positioned sufficiently accurately. Problems are also posed by delays in the control of the positioning.

The object of the present invention is to provide a method and an apparatus in which the above drawbacks are avoided. The method of the invention is characterized in that the intervals between the pulses are divided into parts, and the parts of the divided pulse intervals are utilized in defining the position of the actuator between the pulses.

The apparatus of the invention is further characterized in that the apparatus comprises means for dividing the intervals between the pulses into parts and for defining the position of the actuator between the pulses utilizing the parts of the divided pulse intervals.

The essential idea of the invention is that the position of the actuator of a paper machine is measured by a measuring signal proportional to the rotation of the shaft of the actuator, the measuring signal comprising successive pulses, and that the intervals between the measuring pulses are divided into parts, and that the parts of the divided pulse intervals are utilized in defining the position of the actuator. In a preferred embodiment of the invention, each measuring pulse calibrates the accuracy of the parts of the divided pulse intervals. In a second preferred embodiment, the division of the pulse intervals into parts makes i possible to estimate the position of the actuator at an instant between the pulses. In a third preferred embodiment the measuring pulses are generated by arranging a detection point, such as a magnet, in conjunction with the shaft of the actuator, and by arranging a Hall sensor in the apparatus, the Hall sensor outputting a pulse as the shaft rotates and the detection point passes the Hall sensor.

The advantage of the invention is that the division of the interval between the measuring pulses into parts makes it possible to define the accurate position of the actuator even between the pulses. When the parts of the divided intervals between the pulses are calibrated by the input pulse measured, good accuracy is maintained. As the position of the actuator can be estimated even between the pulses, it is possible to eliminate delays of the feedback positioning from the control. The use of magnets and Hall sensors to generate pulses provides a simple actuator that endures even difficult process conditions.

Figure 2:
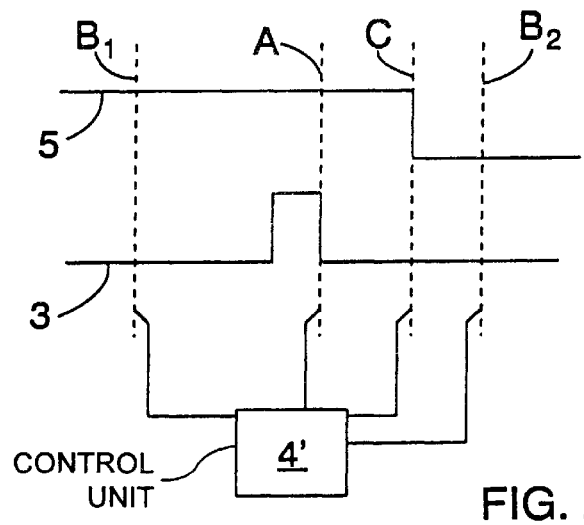
Figure 3:
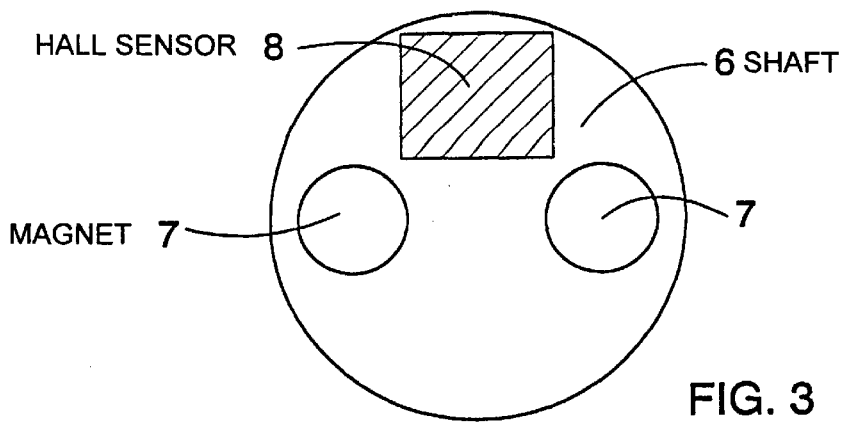

The invention will be described in greater detail in the attached drawing, in which FIG. 1 shows a block diagram illustrating a principle of a solution according to the invention, FIG. 2 illustrates a second principle of a solution according to the invention, and FIG. 3 illustrates a principle of a measuring arrangement according to the invention at a shaft of an actuator, shown as a schematic, partly cross-sectional view and seen from the end of the shaft.

The block diagram of FIG. 1 shows an actuator 1 of a paper machine. The actuator 1 can be an actuator known per se, used, for example, in a steam box, head box or moisturizer or some other part of a paper or board machine. The position of the actuator 1 is defined by measurer 2. The measuring means 2 generate a measuring signal 3 proportional to the rotation of the actuator 1 and thereby the position of the actuator. The measuring signal 3 consists of successive pulses. A control unit 4 utilizes the measuring signal, defines the position of the actuator 1 by the pulses of the signal, and on the basis of the result, controls the actuator according to the need.

The interval between the pulses of the measuring signal 3 corresponds to a certain linear movement on the shaft of the actuator 1. The control unit 4 divides the pulse interval into several parts, whereby the control unit 4 allows the position of the actuator 1 to be defined even between the pulses. If the time between the starting moments of the pulses, i.e. the interval between the pulses, is typically, for example, 500 milliseconds, and the interval is divided into ten parts, then the position of the actuator 1 can be defined at 50-millisecond intervals. Such a division of a 500-millisecond pulse interval into ten parts can be implemented, for example, by an apparatus in which the division interval is 50 milliseconds.

The division of the pulse intervals of the measuring signal 3 can be calibrated each time a new measuring pulse is obtained from the measuring means 2. The division of the pulses is thus maintained accurate all the time. When the interval between the pulses is divided into parts, the position of the actuator 1 can be defined even between the pulses with an accuracy of even a few micrometers.

Because of the delays in the control of the motor, the motor continues to roll for a while even though it has been stopped. If a new pulse is received as the control has been stopped and the actuator is being driven up, or if a pulse ends as the actuator is being driven down, there will an error of one pulse in the pulse count. The error can be avoided by continuously counting pulses in the latest direction, even though the control of the motor has been stopped. When the control of the motor is started, the motor may first start to roll in the wrong direction, whereby the pulses obtained from the motor are counted in the wrong direction. If the pulses are very close to each other, for example at less than 50-millisecond intervals, the pulses are not used to define the position, i.e. the pulse edges detected close to each other are filtered. On account of this, any inaccuracy in the positioning caused by error pulses is avoided.

FIG. 2 illustrates a principle of a second solution according to the invention. The interval between the successive pulses of the measuring signal can also be divided into parts by defining a time label A from the moment of change, the accuracy of the time label being smaller than the interval between the successive pulses of the measuring signal 3. The time label A can be defined, for example, when the value of the measuring signal 3 changes from binary value '0' to binary value '1' or vice versa. The time label A can be adjusted to be very accurate, the accuracy being, for example, 5 milliseconds. Subsequently, if the interval between the successive pulses of the measuring signal 3 is 500 milliseconds, the interval can be divided into a hundred parts. If desired, the time label can be adjusted to be even more accurate, whereby the division interval is so small that the time label can be considered to be continuous. To define the position of the actuator, status data from at least two counting points $B_1$ and $B_2$ is needed in addition to the time label A. The value of the time label A and the value of the measuring signal 3 at counting points $B_1$ and $B_2$ are defined by a control unit 4'. The distance between the counting points $B_1$ and $B_2$ represents the counting interval, which may be, for example, substantially equal to the interval between the pulses of the measuring signal 3 when the actuator is controlled on a continuous basis, whereby a typical value is 500 milliseconds. When the status data of the measuring signal 3 at the second counting point $B_2$ and the status data of the measuring signal 3 at the first counting point $B_1$ e.g. 500 milliseconds earlier, and in addition any time label A between these counting points $B_1$ and $B_2$ are known, the position of the actuator can be defined with great accuracy. The time label A makes it possible to define whether there has been a pulse, an ascending or a descending edge of the pulse in the measuring signal 3 between the counting points $B_1$ and $B_2$, or if no time label has been received between the counting points $B_1$ and $B_2$. It is thus possible to define whether a pulse has been received between the counting points, and all alternatives in which the actuator has moved on the pulse of the measuring signal 3 or from one pulse to the other can also be defined. The time label A can be registered in the memory of the control unit 4', and the position of the actuator 1 can also be studied afterwards.

When the exact time label A and the moment C when the control ends, defined by the control unit 4' by means of a control signal 5, are known, the control unit 4' can easily estimate the position of the actuator very accurately at the control ending moment C by adding the portion between the time label A and the control ending moment C to the value of the time label. The position of the actuator 1 can thus also be estimated between the pulses of the measuring signal 3 even before a new pulse arrives. Delays of the back fed positioning can thus be deleted from the control.

FIG. 3 shows a shaft 6 of the actuator. The actuator is preferably an actuator of a paper or board machine. To improve the cross profile variables of the paper web, it is common to use controllable profiling equipment that is usually divided into control sections crosswise of the web. Each valve, nozzle, or other such element that is in the control section of the profiling equipment and affects the variable of paper is controlled by actuators arranged in the section. Any changes effected by the actuators or elements, for example a motion, force, flow, or the like, have an indirect effect on the cross profile characteristics of paper, which include basis weight, moisture, thickness and gloss.

The motion, force or some other change mentioned above can be effected in the element by the actuators. The shaft 6 of the actuator can be, for example, a control shaft of the actuator or a shaft of the motor. Magnets 7 are arranged in the shaft 6. The apparatus further comprises a Hall sensor 8, which is arranged at the front of the end of the shaft 6. When the motor of the actuator is driven, the shaft 6 rotates, whereby the magnets 7 pass the Hall sensor 8. When the magnet 7 passes the Hall sensor 8, the Hall sensor 8 generates a pulse. The positioning of the actuator is proportional to the rotating movement of the shaft 6, whereby the interval between the pulses corresponds to a certain change in the positioning of the actuator. When the magnets 7 and the Hall sensor 8 are used, a highly reliable signal can be generated, and the apparatus endures well even difficult processing conditions. Instead of being a magnet, the detection point can be, for example, an asymmetrical point in the shaft, such as a notch or a protrusion, or a section of non-magnetic material, the passing of which will be detected by the Hall sensor 7 if the shaft 6 is otherwise of magnetic material. The claimed method and apparatus for defining the position of the actuator are particularly useful, for example, in controlling the steam supply of the steam box of a paper machine. The amount of steam supplied from the steam box onto the surface of the web is currently adjusted by the pressure of the inputted steam. The pressure is difficult to adjust accurately, and so the amount of steam flowing through individual steam nozzles cannot be defined. The pressure is thus defined by an analogue gauge, which is expensive. The solution of the invention is cheap and very accurate, since the precise position of the steam control shaft is known. The amount of steam can be calculated on the basis of pulse data, whereby no separate gauges are needed. The amount of steam is also adjusted very quickly and accurately by means of the pulse data and the control shaft. The invention thus makes it possible to replace expensive measuring devices and to save money.

The drawing and the associated description are intended only to illustrate the idea of the invention. The invention can vary in its details within the scope of the claims.

What is claimed is:

1. In a method for defining a position of an actuator of a paper or board machine, the improvements comprising the steps of:

measuring the position of the actuator by means of a measuring signal proportional to rotation of a shaft of the actuator, the measuring signal comprising successive pulses;

dividing intervals between the pulses into parts; and utilizing the parts of the divided pulse intervals for the defining the position of the actuator between the pulses.

2. A method as claimed in claim 1, wherein the dividing of the interval between the pulses comprises the step of defining a time label from the moment the value of the measuring signal changes.

3. A method as claimed in claim 2, wherein the accuracy of the time label is smaller than the interval between the successive pulses of the measuring signal.

4. A method as claimed in claim 2, further comprising the steps of defining the value of the measuring signal at two counting points spaced from each other, and detecting whether the time label has arrived between the counting points.

5. A method as claimed in claim 2, further comprising the steps of defining the moment when the control signal ends, and estimating the position of the actuator on the basis of the time label and the ending moment of the control signal.

6. A method as claimed in claim 1, comprising the step of estimating the position of the actuator between the pulses by the parts of the divided pulse intervals.

7. A method as claimed in claim 1, comprising the step of calibrating the accuracy of the parts of the divided pulse intervals by a new inputted pulse.

8. A method as claimed in claim 1, comprising the step of generating the pulses of the measuring signal using at least one detection point arranged in conjunction with the shaft and at least one Hall sensor, whereby the Hall sensor sends a measuring pulse as the detection point revolves past the Hall sensor.

9. An apparatus for defining the position of an actuator of a paper or board machine, the apparatus comprising measuring means for measuring the position of the actuator, the measuring means being arranged to generate a measuring signal comprising successive pulses and being proportional to the rotation of a shaft of the actuator, and means for dividing the intervals between the pulses into parts and for defining the position of the actuator between the pulses utilizing the parts of the divided pulse intervals.

10. An apparatus as claimed in claim 9, the apparatus further comprising means for defining a time label as the value of the measuring signal changes.

11. An apparatus as claimed in claim 10, wherein the accuracy of the time label is smaller than the interval between the successive pulses of the measuring signal.

12. An apparatus as claimed in claim 10, the apparatus comprising means for defining the value of the measuring signal at two counting points spaced from each other, and means for defining the value of the time label between the counting points.

13. An apparatus as claimed in claim 10, the apparatus comprising means for defining a moment when the control signal ends, and means for estimating the position of the actuator on the basis of the time label and the ending moment the control signal.

14. An apparatus as claimed in claim 9, the apparatus comprising means for estimating the position of the actuator between the pulses on the basis of the parts of the divided pulse interval.

15. An apparatus as claimed in claim 9, the measuring means comprising at least one Hall sensor and detection point that is detected by the Hall sensor, the detection point being arranged in conjunction with the shaft, and the Hall sensor being arranged to send a measuring pulse as the detection point revolves past the Hall sensor.

* * * * *